(12) United States Patent
Hayashi et al.

(10) Patent No.: US 9,121,682 B2
(45) Date of Patent: Sep. 1, 2015

(54) MEASURING INSTRUMENT

(75) Inventors: Nobuyuki Hayashi, Kawasaki (JP);
Yoshiaki Shiraishi, Kawasaki (JP);
Shuji Hayashida, Kawasaki (JP);
Takefumi Kiwada, Nakatsugawa (JP)

(73) Assignee: MITUTOYO CORPORATION, Kawasaki (JP)

( * ) Notice: Subject to any disclaimer, the term of this patent is extended or adjusted under 35 U.S.C. 154(b) by 284 days.

(21) Appl. No.: 13/603,101

(22) Filed: Sep. 4, 2012

(65) Prior Publication Data
US 2013/0055579 A1  Mar. 7, 2013

(30) Foreign Application Priority Data

Sep. 5, 2011 (JP) ................................ 2011-192931
Aug. 23, 2012 (JP) ................................ 2012-184384

(51) Int. Cl.
| | | |
|---|---|---|
| *G01B 5/00* | (2006.01) | |
| *G01B 3/00* | (2006.01) | |
| *G01B 3/18* | (2006.01) | |
| *G01B 3/22* | (2006.01) | |
| *G01D 7/06* | (2006.01) | |
| G01B 11/02 | (2006.01) | |
| G01B 3/20 | (2006.01) | |
| G01B 7/02 | (2006.01) | |

(52) U.S. Cl.
CPC *G01B 3/002* (2013.01); *G01B 3/18* (2013.01); *G01B 3/205* (2013.01); *G01B 3/22* (2013.01); *G01D 7/06* (2013.01); *G01B 3/20* (2013.01); *G01B 7/02* (2013.01); *G01B 11/02* (2013.01)

(58) Field of Classification Search
CPC ............ G01B 3/205; G01B 3/18; G01B 3/20; G01B 7/02; G01B 11/02

USPC .................................. 33/784, 866.3; 313/504
See application file for complete search history.

(56) References Cited

U.S. PATENT DOCUMENTS

| | | | |
|---|---|---|---|
| 4,862,395 A | 8/1989 | Fey et al. | |
| 5,072,174 A | 12/1991 | Weber | |
| 7,765,712 B2 * | 8/2010 | Stockman | ........................ 33/784 |

(Continued)

FOREIGN PATENT DOCUMENTS

| | | |
|---|---|---|
| DE | 20 2005 016 292 U1 | 12/2005 |
| DE | 10 2004 041 119 A1 | 3/2006 |

(Continued)

OTHER PUBLICATIONS

Nov. 21, 2012 Partial European Search Report issued in Patent Application No. 12006264.1.

(Continued)

*Primary Examiner* — Laura Martin
*Assistant Examiner* — Rhyan C Lange
(74) *Attorney, Agent, or Firm* — Oliff PLC

(57) ABSTRACT

A measuring instrument includes a display that displays measurements. The display is provided by an organic electroluminescent display device or an electronic paper including an assembly of organic EL (Electro-Luminescence) devices. Since the display is provided by the organic electroluminescent display device or an electronic paper including an assembly of organic electroluminescence devices, visibility of the display can be enhanced. Further, since the display can be used for various measuring instruments in common and the display design can be easily changed, production cost can be reduced.

7 Claims, 18 Drawing Sheets

(56) References Cited

U.S. PATENT DOCUMENTS

| | | | |
|---|---|---|---|
| 8,001,698 B2* | 8/2011 | Hayashida et al. | 33/518 |
| 2004/0035012 A1 | 2/2004 | Moehnke et al. | |
| 2005/0110702 A1* | 5/2005 | Aoki et al. | 345/30 |
| 2005/0276164 A1* | 12/2005 | Amron | 368/82 |
| 2006/0267791 A1 | 11/2006 | Chiang et al. | |
| 2008/0184582 A1 | 8/2008 | Kim | |
| 2009/0051830 A1* | 2/2009 | Matsushita et al. | 348/836 |
| 2011/0018416 A1* | 1/2011 | Sassa | 313/45 |
| 2011/0102976 A1 | 5/2011 | Chen | |

FOREIGN PATENT DOCUMENTS

| | | | |
|---|---|---|---|
| DE | 10 2005 061 036 A1 | | 6/2007 |
| EP | 0 447 580 A1 | | 9/1991 |
| JP | 11142190 | * | 5/1999 |
| JP | A-11-142190 | | 5/1999 |
| JP | A-2000-131098 | | 5/2000 |
| JP | B2-3351848 | | 12/2002 |
| JP | A-2007-78411 | | 3/2007 |
| JP | A-2008-016347 | | 1/2008 |
| JP | 3351848 B2 | * | 3/2012 |
| TW | 201008712 | | 3/2010 |

OTHER PUBLICATIONS

Jan. 9, 2014 Extended European Search Report issued in European Patent Application No. 13004587.5.

Extended European Search Report issued in European Application No. 12006264.1 dated Feb. 6, 2013.

* cited by examiner

MEASURING INSTRUMENT

The entire disclosure of Japanese Patent Applications No. 2011-492931 filed Sep. 5, 2011 and No. 2012-484384 filed Aug. 23, 2012 is expressly incorporated by reference herein.

BACKGROUND OF THE INVENTION

1. Field of the Invention

The present invention relates to a measuring instrument. More specifically, the present invention relates to a measuring instrument including a display on which measurements are displayed.

2. Description of the Related Art

Some of measuring instruments for measuring distance, length and the like employ a display of LCDs (Liquid Crystal Displays) for displaying the measurements, the LCDs being respectively designed for each of the measuring instruments (see Literature 1 (JP-A-2007-78411)).

For instance, as shown in FIG. 16, a display of a vernier caliper has a numeral-display area 100 including five digits of seven-segment display elements and an inch/millimeter display area 101 displaying "in mm."

As shown in FIG. 17, a display of a micrometer has a numeral-display area 100 including six digits of seven-segment display elements and an inch/millimeter display area 101 displaying "in mm."

Further, as shown in FIG. 18, a display of an indicator (dial gauge) has a numeral-display area 100 including six digits of seven-segment display elements, an inch/millimeter display area 101 displaying "in mm", a pass/fail display area 102 for displaying pass/failure with signs "○" and "Δ" and a remaining-battery-power display area 103 for displaying battery remaining power.

As described above, since the displays of typical measuring instruments employ LCDs of designs dedicated for each of the measuring instruments, it is difficult to use the display in common with each of the measuring instruments. Further, when the display design is to be changed, the LCD has to be re-designed and re-manufactured, so that the production cost increases.

Further, the LCD used for the display of measuring instruments provides narrow view angle (approximately 40 degrees), the LCD is poor in visibility according to the angle to be viewed. Especially, it is difficult to read the displayed information in a dark area in a factory and the like.

SUMMARY OF THE INVENTION

An object of the invention is to provide a measuring instrument that solves the above conventional problems, is adapted to improve the visibility and is capable of reducing production cost.

A measuring instrument according to an aspect of the invention includes a display on which measurements are displayed, in which the display is provided by an organic electroluminescent display device or an electronic paper including an assembly of organic electroluminescence devices.

Herein, the measuring instrument refers to a measuring instrument for measuring a physical quantity such as a length, distance and angle (e.g. a vernier caliper, micrometer and indicator (dial gauge)).

According to the above arrangement, since the display is provided by the organic electroluminescent display device or the electronic paper including an assembly of organic electroluminescent devices, visibility of the display can be enhanced.

Especially, since the organic electroluminescent display device has a wide view angle (almost 180 degrees) and is self-luminous, improvement in visibility can be expected. Further, since the display contents on the display can be easily changed, the display can be used in common with a plurality of types of measuring instruments. In addition, since the display design can be easily changed, the production cost can be reduced.

In the measuring instrument according to the above aspect of the invention, the display is a dot-matrix type in which display elements are arranged in a matrix.

According to the above arrangement, the measurements can be displayed not only in a numerical form, but also in various designs.

In the measuring instrument according to the above aspect of the invention, the display is preferably provided with a numerical image display area that displays the measurements in a numerical image, a bar-segment image display area that displays the measurements in a plurality of bar segment images and a pointer image display area that displays the measurements in a scale image and a pointer image, the numerical image display area, the bar-segment image display area and the pointer image display area being displayed in a selectable manner.

According to the above arrangement, since the display is provided with the numerical image display area that displays the measurements in a numerical image, the bar-segment image display area that displays the measurements in a plurality of bar segment images and the pointer image display area that displays the measurements in a scale image and a pointer image, the numerical image display area, the bar-segment image display area and the pointer image display area being displayed in a selectable manner, the most suitable combination of display area(s) can be selected in accordance with the type of the measuring instrument.

In this ease, with two or more display areas being selected and simultaneously displayed (e.g. simultaneously displaying the numerical image display area, and the bar-segment image display area or the pointer image display area), while the tendency of the measurements can be recognized by the bar-segment image display area or the pointer image display area, the tendency of the measurements can be numerically recognized by the numerical image display area.

In the measuring instrument according to the above aspect of the invention, the display is preferably provided with a scale-segment image display area that displays a plurality of scale-segment images arranged in a circle and a reversed image display area that reversely displays the scale segment image corresponding to an angular area in accordance with the measurements, and the measuring instrument is preferably provided with a scale-interval switch that switches an interval between the scale segment images in accordance with a display resolution.

According to the above arrangement, the tendency of the measurements can be recognized by the area of the reversed image display area relative to the scale-segment image display area.

Further, since the measuring instrument includes the scale-interval switch that switches an interval between the scale segment images in accordance with a display resolution, a display corresponding to a required display resolution can be selected.

In the measuring instrument according to the above aspect of the invention, the display is preferably provided with a graph image display area that displays the measurements in a graph image.

According to the above arrangement, when an object is continuously measured while moving the measuring instrument, since the continuously measured measurements can be displayed as a graph image, the tendency of the measurements of the object to be measured can be recognized.

In the measuring instrument according to the above aspect of the invention, it is preferable that a display surface of the display is curved.

Generally, when the display surface of the display is flat, since an external light reflects on the entire surface of the display surface, the measurements may become difficult to read depending on a view angle. Especially, when the measuring instrument is read as it stands, since the attitude may sometimes be restricted, the above-mentioned reflection is inevitable.

According to the above arrangement, since the display surface of the display is curved, the measurements can be more readily read as compared to an arrangement in which the display surface is flat. Thus, even under an environment in which the attitude of the measuring instrument is restricted, the measurement can be readily read.

Further, with the use of flexible material (e.g. plastics) for a display substrate of the display, the display surface can be easily curved. Especially, since the organic electroluminescent display device has a wide view angle, deterioration of visibility can be avoided.

In the measuring instrument according to the above aspect of the invention, it is preferable that the display surface has an outer profile shaped in a rectangle and is cylindrically dented along a horizontal or vertical axis of the rectangle.

According to the above arrangement, since the display surface is shaded by an "eave" provided by an upper or side periphery of the display surface, the visibility can be further enhanced.

In the measuring instrument according to the above aspect of the invention, it is preferable that the display surface has an outer profile shaped in a rectangle and is cylindrically projected along a horizontal or vertical axis of the rectangle.

According to the above arrangement, since the display surface is cylindrically projected along the horizontal or vertical axis of the rectangle, the display surface can be read not only in a front direction but also in a direction other than the front direction (i.e. a vertical direction or a lateral direction). Especially, when pass/failure determination results are displayed on the display surface, the pass/failure determination results can be recognized by changing a back color of the display and identifying the color of the display in a direction other than the front direction (e.g. displaying the display in green when the measurements are within a tolerance level (i.e. "pass") and displaying the display in red when the measurements are outside the tolerance level (i.e. "failure")).

In the measuring instrument according to the above aspect of the invention, it is preferable that the measuring instrument includes a cylindrical body, a spindle provided to the body in a manner capable of a displacement in an axial direction of the body and a display controller for displaying the displacement of the spindle on the display, and the display is provided on a circumference of the body along the axial direction.

With the above arrangement, even when the measuring instrument has the elongated cylindrical body and includes a separate display for displaying the measurements via a cable, since the display can be provided along the circumference of the body, the measurements can be read not only from the separate display but also from the display on the body. Accordingly, the measurements can be readily read, usability of the instrument can be enhanced.

In the measuring instrument according to the above aspect of the invention, it is preferable that the measuring instrument includes a body, a movable member provided to the body in a manner capable of a displacement and a display controller for displaying the displacement of the movable member on the display, and the display includes a flexible display sheet housed in the body in a manner windable and capable of being drawn out of the body.

According to the above arrangement, since the display is provided by the flexible display sheet housed in the body in a manner windable and capable of being drawn out of the body, the display area can be enlarged by drawing out the display sheet from the body, as necessary, so that more measurement information can be displayed.

In the measuring instrument according to the above aspect of the invention, it is preferable that the display sheet is capable of being drawn out from a front side of the body and being fixed on a back side of the body, and identical measurements are displayed on the display sheet on the front side of the body and the display sheet on the back side of the body.

According to the above arrangement, by drawing out the display sheet from the front side of the body and fixing the display sheet on the back side of the body, the measurements can be read from both, the front and back sides of the body. Accordingly, even under measurement conditions where the measurements have to be read from the back side of the body according to the attitude of the measuring instrument, the measurements can be easily read.

Especially, a vernier caliper including a main scale (the body) and a slider (the movable member) applied with the above arrangement can be also used a vernier caliper for a left-handed operator. Usually, when a vernier caliper is operated while being held by a right band, the front side of the vernier caliper faces the operator. However, when the vernier caliper is operated while being held by a left hand, the back side of the vernier caliper faces the operator. At this time, since the measurements can be read from the back side of the body, the vernier caliper can be used also for a left-handed operator. Thus, no independent vernier caliper for a left-handed operator is not necessary to be produced, the economic efficiency can be enhanced.

DESCRIPTION OF EMBODIMENT

First Exemplary Embodiment

Arrangement of Measuring Instrument

Figure 1:
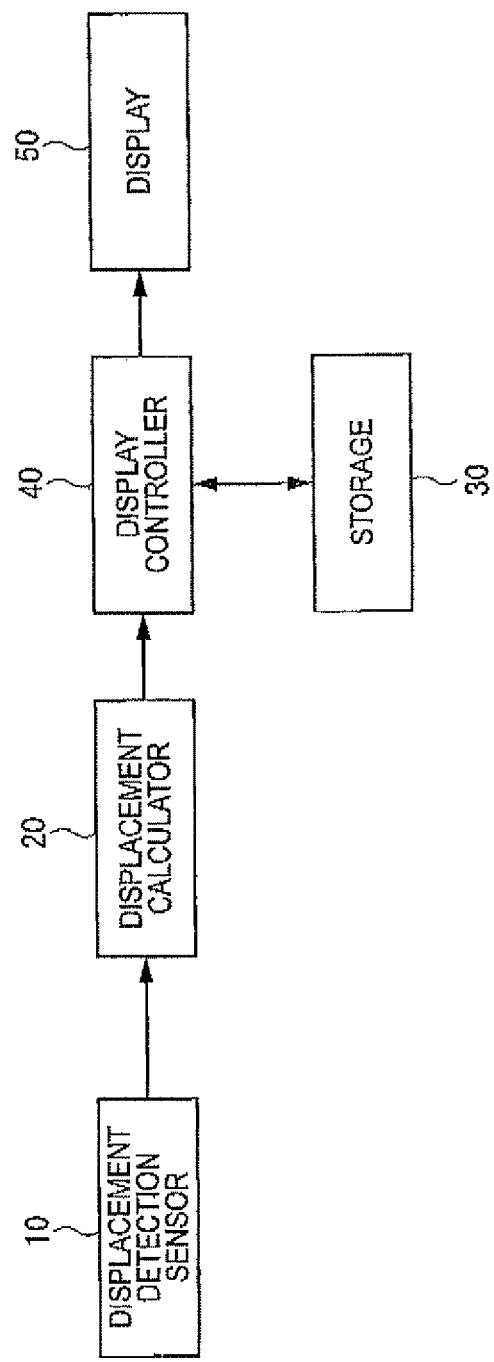
FIG. 1 is a block diagram showing a measuring instrument according to a first exemplary embodiment of the invention.

FIG. 1 illustrates a measuring instrument according to a first exemplary embodiment.

The measuring instrument includes a displacement detection sensor 10, a displacement calculator 20, a storage 30, a display controller 40 and a display 50.

Herein, the measuring instrument refers to a measuring instrument including a movable member that is movable relative to a body and measuring a dimension of an object to be measured based on a displacement of the movable member (e.g. a vernier caliper, micrometer and indicator (dial gauge)).

Figure 16:
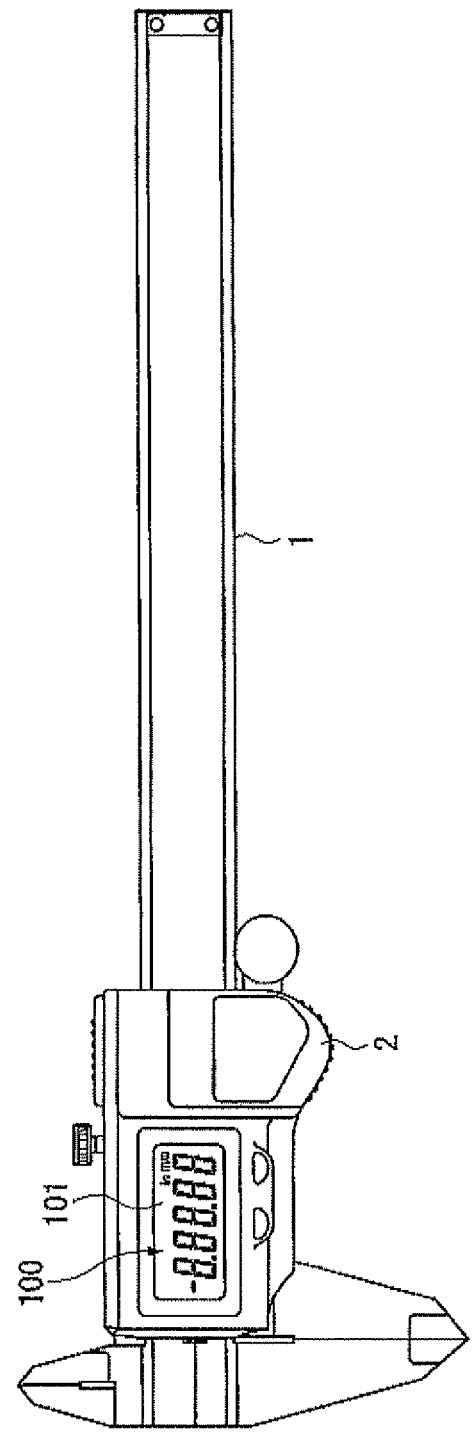
FIG. 16 illustrates a display example of a display of a conventional vernier caliper.
Figure 17:
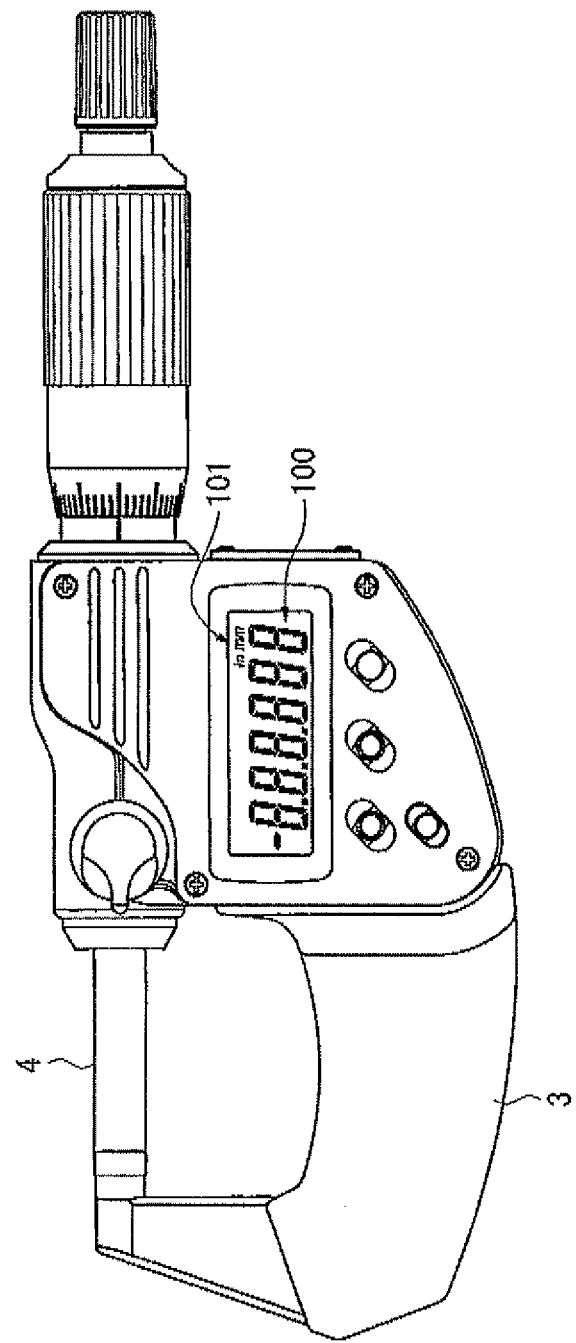
FIG. 17 illustrates a display example of a display of a conventional micrometer.
Figure 18:
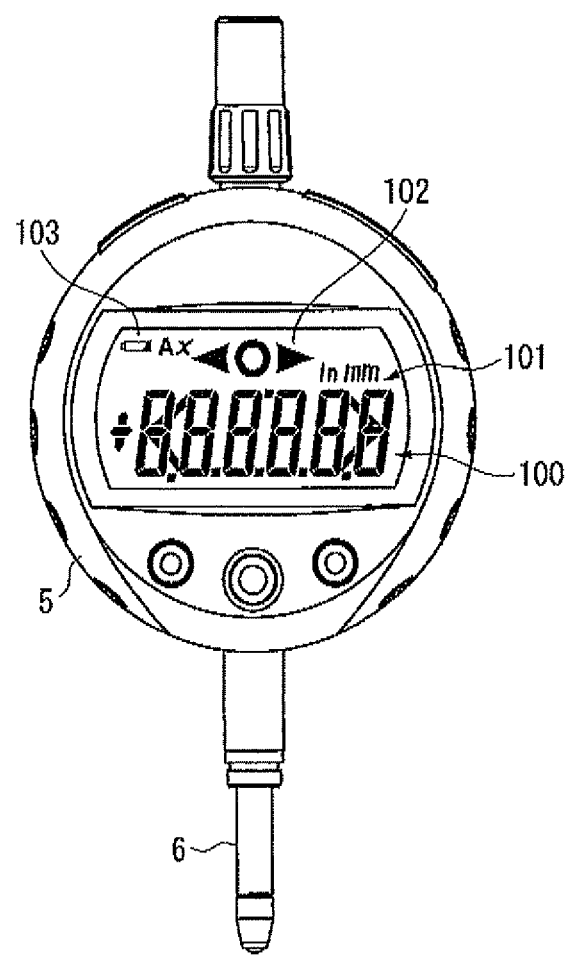
FIG. 18 illustrates a display example of a display of a conventional indicator.

The displacement detection sensor 10 detects a displacement of the movable member of the measuring instrument. For instance, a vernier caliper shown in FIG. 16 detects a displacement of a slider 2 (movable member) relative to a main scale 1 (main body). A micrometer shown in FIG. 17 detects a displacement of a spindle 4 (movable member) relative to a main body 3. Further, an indicator shown in FIG. 18 detects a displacement of a spindle 6 (movable member) relative to a main body 5.

These displacement detection sensors 10 can be provided by, for instance in a vernier caliper, an electrostatic encoder including a main scale provided in a longitudinal direction of the main scale 1 at a predetermined interval and a detector head provided on the slider 2 opposite to the main scale.

The displacement calculator 20 arithmetically processes signals from the displacement detection sensor 10 to calculate the displacement of the movable member of the measuring instrument. The calculated results are provided to the display controller 40.

The storage 30 stores image data to be displayed on the display 50 as well as a program for controlling an operation of the display controller 40.

The display controller 40 displays an image on the display 50 based on the image data stored in the storage 30. Further, the display controller 40 displays the measurements calculated by the displacement calculator 20 as an image on the display 50.

Figure 2:
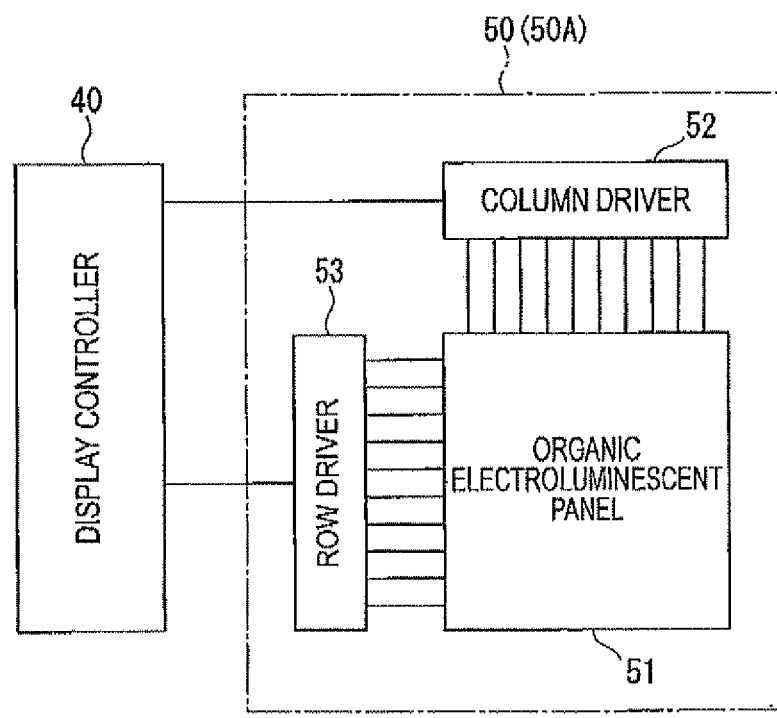
FIG. 2 is a block diagram showing a display controller and a display according to the first exemplary embodiment.

As shown in FIG. 2, the display 50 is provided by an organic electroluminescent (Electro-Luminescence) display device 50A.

The organic electroluminescent display device 50A includes an organic electroluminescent panel 51 having a flat horizontally elongated rectangular display surface, a column driver 52 and a row driver 53.

The organic electroluminescent panel 51 is designed to provide, for instance, a black-and-white screen, in which organic electroluminescence devices (pixels) are respectively disposed at intersections of a plurality of signal lines and scan lines arranged in a matrix.

When the column driver 52 applies voltage to the signal line(s) and the row driver 53 simultaneously applies voltage to the scan line(s), the organic electroluminescence device(s) disposed at the intersection emits light. The image information is displayed in two colors (i.e. black and white), where the emitting portion is shown white while non-emitting portion is shown black. In other words, the display controller 40 displays characters and figures on the organic electroluminescent panel 51 based on the image data.

Incidentally, the above drive method of organic electroluminescent panel is referred to as "simple matrix method" or "passive matrix method."

Displaying Measurements

When the movable member moves relative to the body, the displacement of the movable member relative to the body is detected by the displacement detection sensor 10 as electric signals that are then sent to the displacement calculator 20. The displacement calculator 20 calculates the displacement of the movable member relative to the body based on the detection signals from the displacement detection sensor 10 and sends the results to the display controller 40.

The display controller 40 displays an image on the display 50 based on the image data stored in the storage 30. Further, the display controller 40 displays the measurements calculated by the displacement calculator 20 as an image on the display 50.

Thus, by storing the image data to be displayed on the display 50 for each of the measuring instruments in the storage 30, the display 50 can be used for every measuring instruments in common.

Figure 3A:
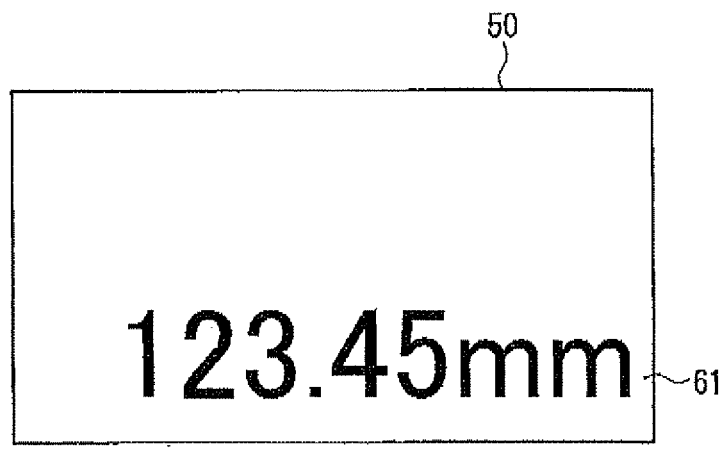
FIG. 3A illustrates a display example of the display according to the first exemplary embodiment.
Figure 3B:
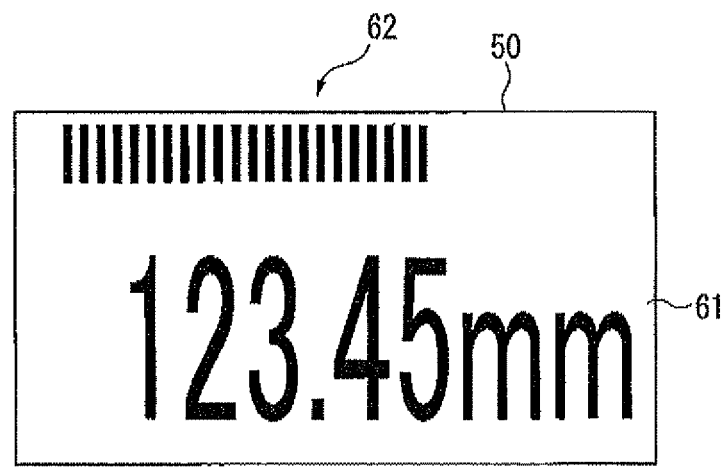
FIG. 3B illustrates another display example of the display according to the first exemplary embodiment.
Figure 3C:
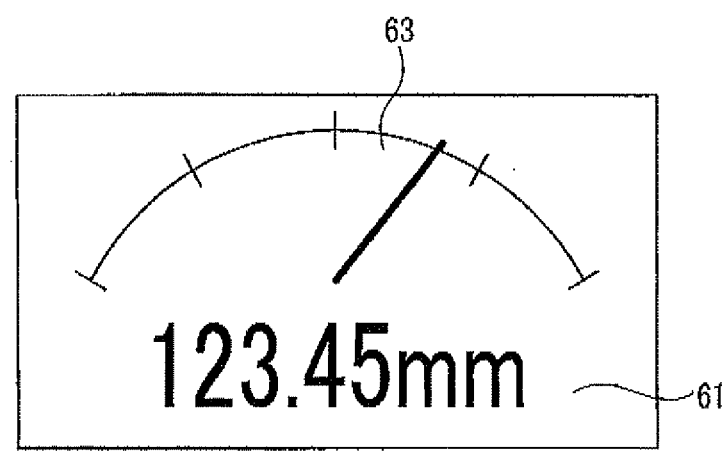
FIG. 3C illustrates still another display example of the display according to the first exemplary embodiment.

For instance, an image data for displaying the measurements as a numerical image, an image data for displaying the measurements in a plurality of bar segment images and an image data for displaying the measurements in a scale image and a pointer image may be stored in the storage 30 and these image data may be selectively displayed on the display 50 in order for the images shown in FIGS. 3A, 3B and 3C to be displayed on the display 50. With such an arrangement, the display 50 can be used for all of the measuring instruments in common.

Incidentally, FIG. 3A shows an example in which only a numerical image display area 61 for displaying the measurements in a numerical image is displayed on the display 50.

FIG. 3B shows an example in which a bar-segment image display area 62 for displaying the measurements in a plurality of bar segment images and a numerical image display area 61 for displaying the measurements in a numerical image are displayed on upper and lower sides of the display 50.

FIG. 3C shows an example in which a pointer image display area 63 for displaying the measurements in a scale image and a pointer image and the numerical image display area 61 for displaying the measurements in a numerical image are displayed on upper and lower sides of the display 50.

With two or more display areas being simultaneously displayed on the display 50 (e.g. simultaneously displaying the numerical image display area 61, and the bar-segment image display area 62 or the pointer image display area 63), while the tendency of the measurements can be recognized by the bar-segment image display area 62 for the pointer image display area 63, the tendency can be numerically recognized by the numerical image display area 61.

Thus, by selecting the image data stored in the storage 30, the most suitable display area can be selected in accordance with the type of the measuring instrument.

Further, since the display contents on the display 50 can be easily changed, in other words, the display design can be easily changed, the production cost can be reduced.

Further, since the display 50 is provided by the organic electroluminescent panel 51 including an assembly of organic electroluminescence devices, visibility of the display 50 can be enhanced. Specifically, since the organic electroluminescent panel 51 has a wide view angle (almost 180 degrees) and is self-luminous, improvement in visibility can be expected.

Further, since the organic electroluminescent panel 51 is a dot-matrix type having the organic electroluminescence devices arranged in a matrix, not only the numerical display of the measurements but also various display designs can be provided.

Second Exemplary Embodiment

Figure 4:
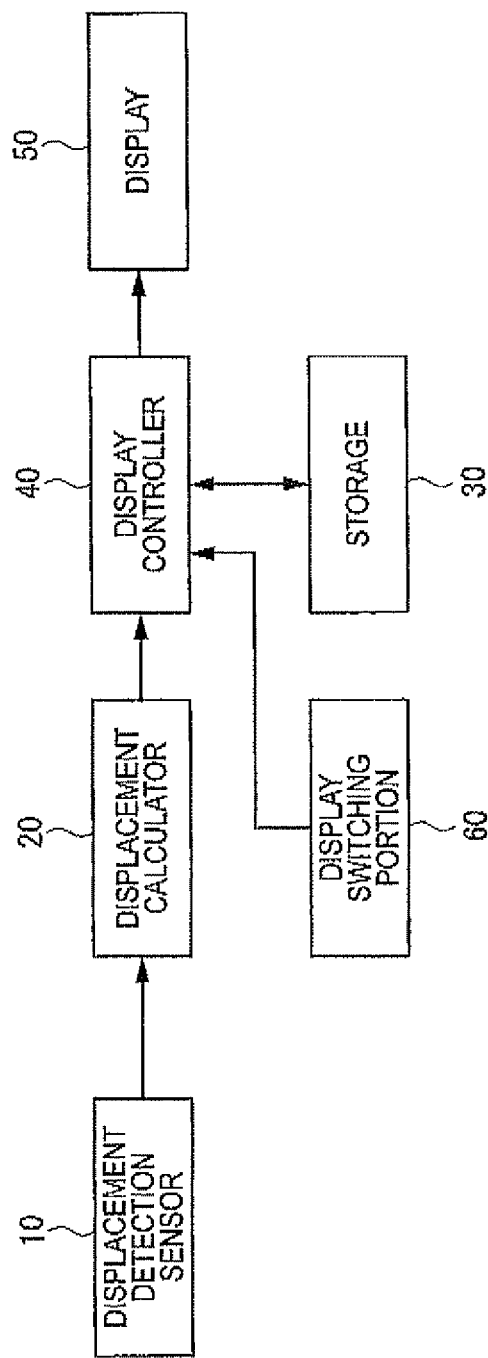
FIG. 4 is a block diagram showing a measuring instrument according to a second exemplary embodiment of the invention.

FIG. 4 illustrates a measuring instrument according to a second exemplary embodiment. In the description of the second exemplary embodiment, the same components as those in the first exemplary embodiment will be denoted by the same reference numerals and explanation thereof will be omitted.

The measuring instrument is an example in which the invention is applied in a form of a display of a dial gauge. As in the measuring instrument in the first exemplary embodiment, the measuring instrument includes a displacement detection sensor 10, a displacement calculator 20, a storage 30, a display controller 40, a display 50 and a display switching portion 60.

The storage 30 of the second exemplary embodiment stores: a first display mode data for displaying the measurements as a numerical image and a plurality of scale segment images arranged in a circle, and simultaneously reversely displaying the scale segment images corresponding to an angular range in accordance with the measurements; a second display mode data for displaying an interval between the scale segment images in different intervals in accordance with display resolution; a third display mode data for displaying the plurality of scale segment images in a circle and for displaying a pointer image at an angular position corresponding to the measurements; and a fourth display mode data for displaying the measurements in a numerical image and in a graph image.

The display switching portion 60 switchably displays one of the data stored in the storage 30 on the display 50.

Figure 5:
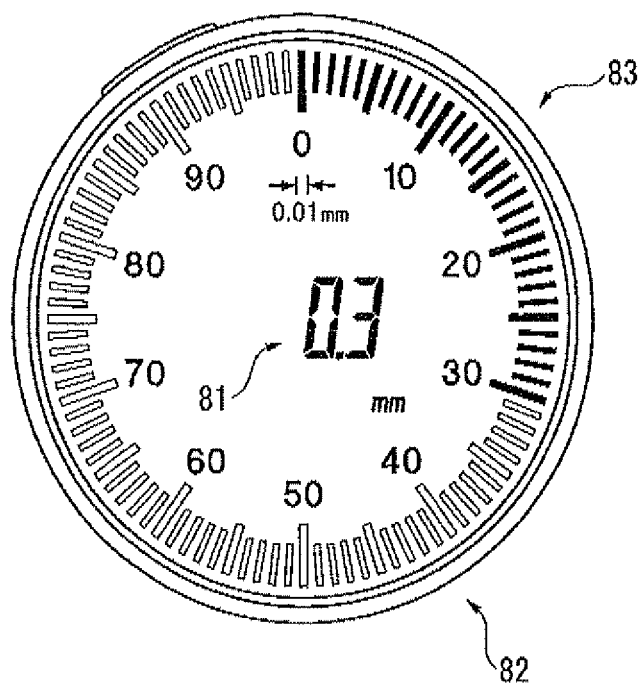
FIG. 5 illustrates a display example (normal resolution display example) of the display according to the second exemplary embodiment.

Supposing that, as shown in FIG. 5, a numerical image display area 81 for displaying the measurements in a numerical image, a scale-segment image display area 82 for displaying a plurality of scale segment images arranged in a circle and a reversed image display area 83 for reversely displaying the scale segment images corresponding to the angular range in accordance with the measurements are displayed on the display 50 (i.e. the first display mode data is selected), the tendency of the measurements can be recognized by the area of the reversed image display area 83 relative to the scale-segment image display area 82.

Figure 6:
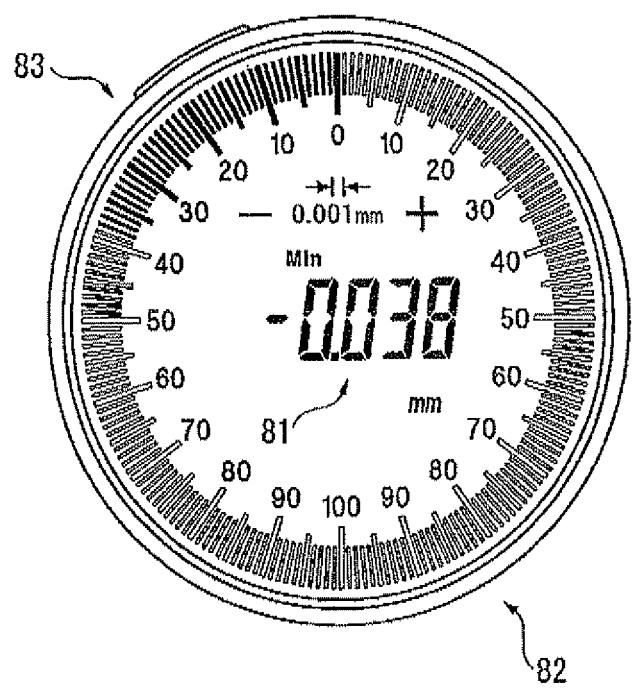
FIG. 6 illustrates another display example (modified resolution display example) of the display according to the second exemplary embodiment.

In this state, when a command for switching to the second display mode data is issued by the display switching portion 60, the display 50 is switched to the display state as shown in FIG. 6. Specifically, the interval between the scale segment images is switched in accordance with a display resolution, so that a display corresponding to the required display resolution can be selected. The display switching portion 60 herein provides a scale-interval switch for switching the interval between the scale segment images in accordance with display resolution.

Figure 7:
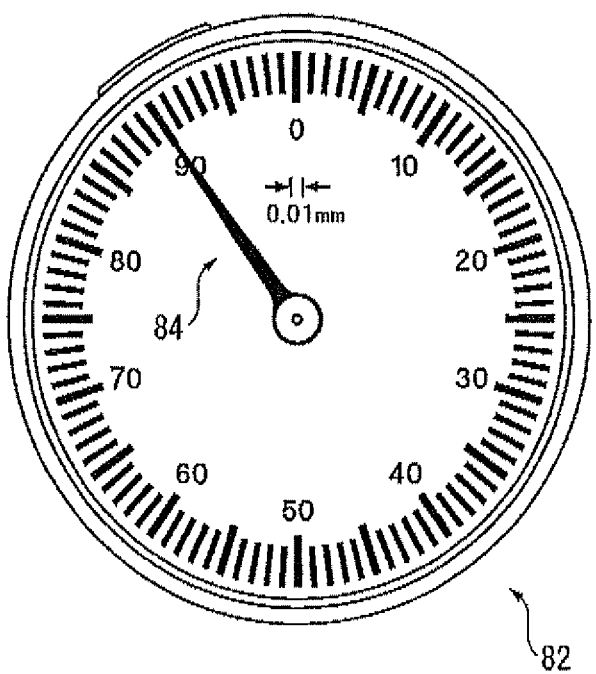
FIG. 7 illustrates still another display example (pointer image display) of the display according to the second exemplary embodiment.

Further, when a command for switching to the third display mode data is issued by the display switching portion 60, the display 50 is switched to the display state as shown in FIG. 7. Specifically, the scale-segment image display area 82 for displaying the plurality of scale segment images arranged in a circle and a pointer image display area 84 for displaying a pointer image at an angular position corresponding to the measurements are displayed.

Thus, with the above display state, since a display of an analog dial gauge can be simulated, the shape and dimension of an object to be measured can be measured according to the pointer movement similar to that in an analog dial gauge.

Figure 8:
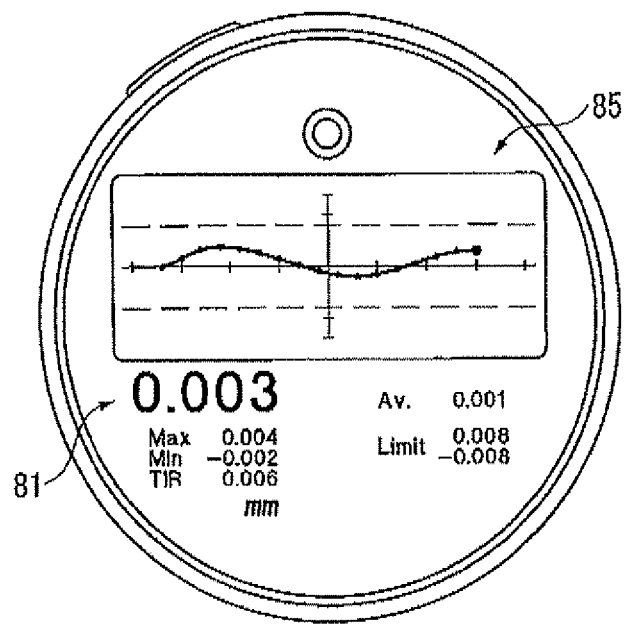
FIG. 8 illustrates a further display example (graph image display) of the display according to the second exemplary embodiment.

Further, when a command for switching to the fourth display mode data is issued by the display switching portion 60, the display 50 is switched to the display state as shown in FIG. 8. Specifically, a graph image display area 85 for displaying the measurements in a graph image and a numerical image display area 81 for displaying the measurements in a numerical image are displayed on upper and lower sides of the display 50.

Thus, with the above display state, for instance, when an object is continuously measured while moving the measuring instrument, since the continuously measured measurements can be displayed as a graph image, the tendency of the measurements of the object to be measured can be recognized.

Modification(s)

It should be understood that the scope of the present invention is not limited to the above-described exemplary embodiments but includes modifications and improvements as long as the modifications and improvements are compatible with the invention.

The display 50 of the first exemplary embodiment is provided by the organic electroluminescent display device 50A to have a flat and horizontally elongated rectangular display surface. However, the display surface of the display 50 may be curved.

Figure 9:
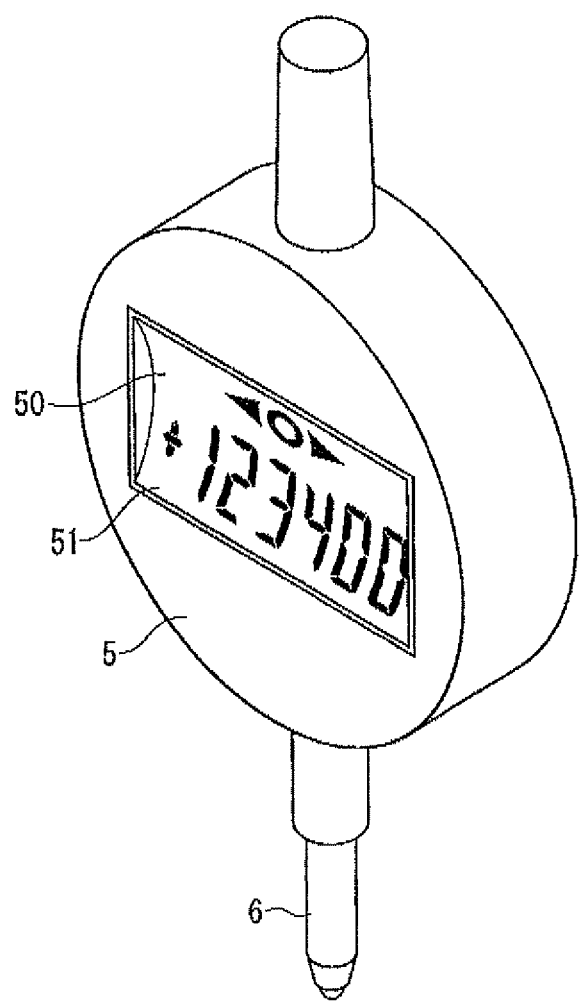
FIG. 9 illustrates an example of the display of the measuring instrument of the invention having a cylindrically dented display surface.

For instance, as shown in FIG. 9 (an example of an indicator), the display surface of the display 50 may be formed to have a horizontally elongated rectangular outer profile and may be cylindrically dented along the horizontal axis of the rectangle.

According to the above arrangement, since the display surface of the display 50 is curved, difficulty in reading the displayed information can be eased as compared with a flat display surface. Accordingly, the measurements can be easily read even under an environment in which an attitude of a measuring instrument is restricted. Especially, since the display surface has a rectangular outer profile and is cylindrically dented along the horizontal axis of the rectangle, the display surface can be shaded by the upper periphery of the display surface (i.e. using the upper periphery as an eave), thereby further enhancing the visibility.

When a display substrate is provided by a flexible material (e.g. plastics), the display surface can be easily provided in a curved shape, where, since the organic electroluminescent display device 50 has a wide view angle, decrease in visibility can be avoided.

Figure 10:
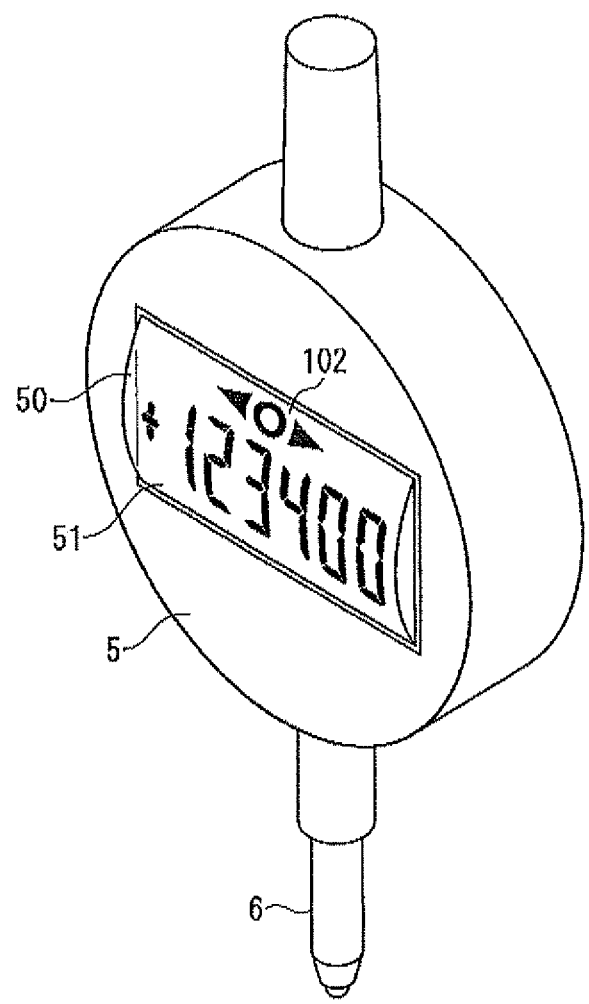
FIG. 10 illustrates an example of the display of the measuring instrument of the invention having a cylindrically projected display surface.

Alternatively, as shown in FIG. 10 (an example of an indicator), the display surface of the display 50 may be formed to have a horizontally elongated rectangular outer profile and may be cylindrically projected along the horizontal axis of the rectangle.

With the above arrangement, since the display surface has the rectangular outer profile and is cylindrically projected in the horizontal axis of the rectangle, the display surface can be read not only in a front direction but also in a direction other than the front direction (i.e. a vertical or lateral direction). Especially, when pass/failure determination results are displayed by providing the pass/fail display area 102 on the display surface, the pass/failure determination results can be recognized by changing a back color of the display 50 and identifying the color of the display 50 in a direction other than the front direction (e.g. displaying the display 50 in green when the measurements are within a tolerance level (i.e. "pass") and displaying the display 50 in red when the measurements are outside the tolerance level (i.e. "failure")).

Incidentally, similar advantages can be expected by denting or projecting the cylindrical display surface of the display 50 shown in FIGS. 9 and 10 not along the horizontal axis but along the vertical axis of the rectangle.

Figure 11:
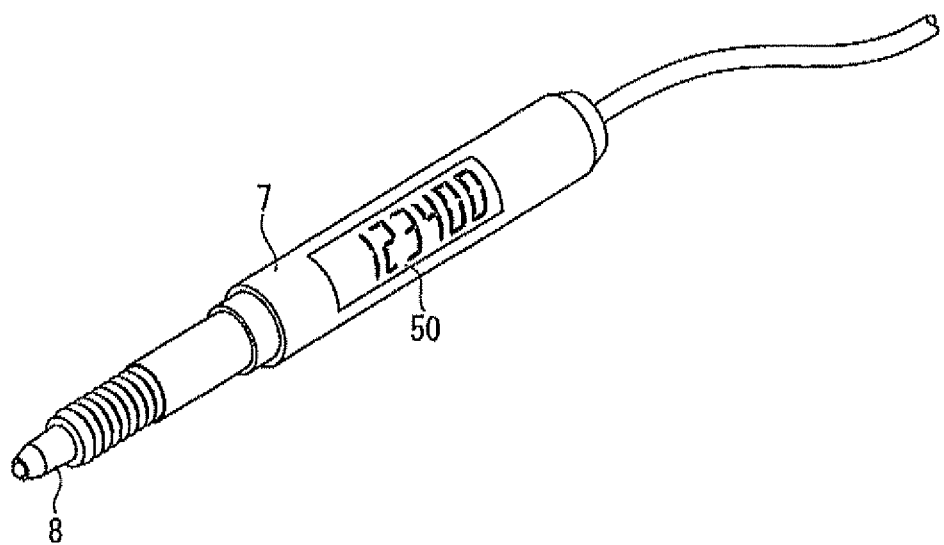
FIG. 11 illustrates an example of the measuring instrument of the invention in which the display is disposed on a circumference of a body.

Further, as shown in FIG. 11, the display 50 provided by the organic electroluminescent display device 50A may be axially provided on a circumference of a body 7 of a linear displacement measuring instrument including the elongated cylindrical body 7, a spindle 8 displaceable in the axial direction of the body 7, and a display controller (the display controller 40 shown in FIGS. 1 and 4) for displaying the displacement of the spindle 8 on the display 50.

With the above arrangement, even when the measuring instrument has the elongated cylindrical body 7 and includes a separate display for displaying the measurements via a cable, since the display 50 can be axially provided along the circumference of the body 7, the measurements can be read not only from the separate display but also from the display 50 on the body 7. Accordingly, the displayed measurements can be readily read, so that usability of the instrument can be enhanced.

Figure 12:
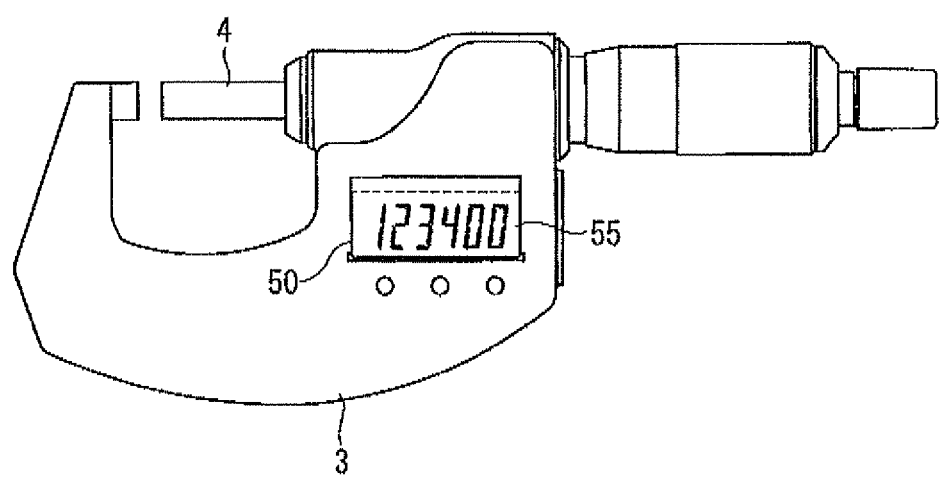
FIG. 12 illustrates an example of the measuring instrument of the invention in which the display is provided by an organic electroluminescent display sheet.
Figure 13:
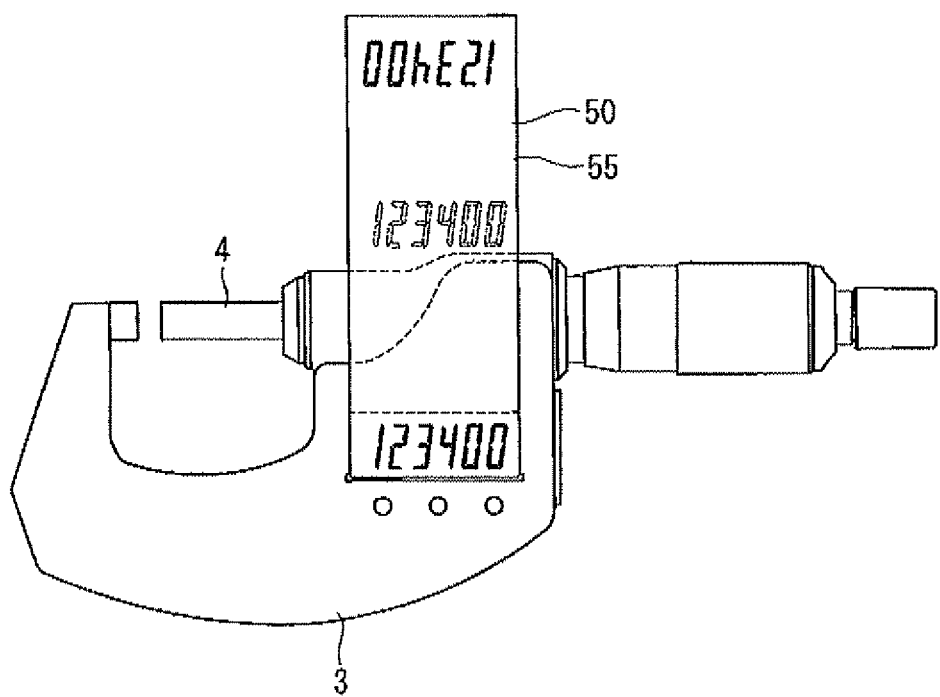
FIG. 13 illustrates the organic electroluminescent display sheet shown in FIG. 12 that is drawn out of the measuring instrument.
Figure 14:
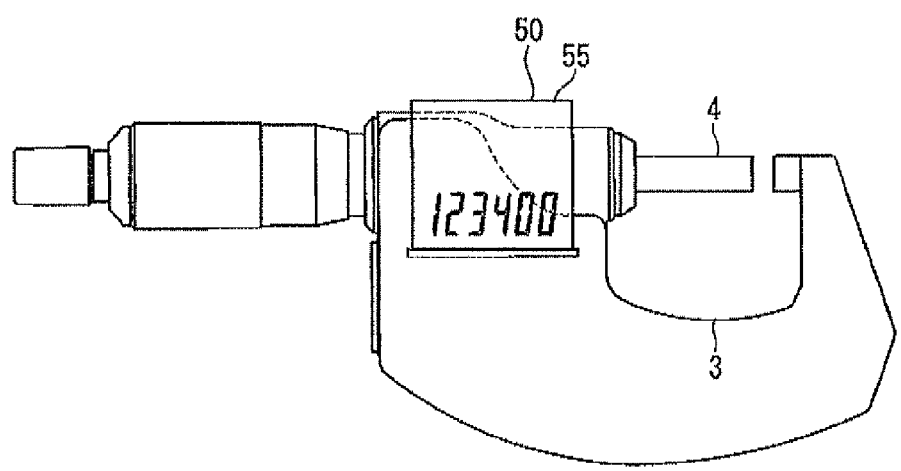
FIG. 14 illustrates the organic electroluminescent display sheet shown in FIG. 13 that is fixed to a back side of a body.

Further, the display 50 of a micrometer shown in FIGS. 12 to 14 may be provided by an organic electroluminescent display sheet 55 having a flexible substrate (e.g. plastics). The micrometer includes a body 3, a spindle 4 displaceable in the body 3, and a display. controller (the display controller 40 shown in FIGS. 1 and 4) for displaying the displacement of the spindle 4 on the display 50, where the organic electroluminescent display sheet 55 is adapted to be wound to be housed within the body 3 and drawn out of the body 3.

The organic electroluminescent display sheet 55 is adapted to be drawn out from a front side of the body 3 and adapted to be fixed to a back side of the body 3. The same measurements are displayed on the organic electroluminescent display sheet 55 on the front side and the organic electroluminescent display sheet 55 on the back side.

With the above arrangement, since the display 50 is provided by the organic electroluminescent display sheet 55 adapted to be wound to be housed in the body 3 and adapted to be drawn out of the body 3, by drawing out the organic electroluminescent display sheet 55 from the front side of the body 3 as necessary (see FIG. 13) and fixing the organic electroluminescent display sheet 55 on the back side of the body 3 (see FIG. 14), the measurements can be read on both the front and back sides of the body 3. Accordingly, even under measurement conditions where the measurements have to be read from the back side of the body 3 according to the attitude of the measuring instrument, the measurements can be easily read.

Incidentally, the organic electroluminescent display sheet 55 may not be adapted to be wound but may only be extended from the front side to the back side of the body 3 to be fixed.

When the organic electroluminescent display sheet 55 is drawn out of the body 3, the drawn-out portion may be partitioned into three areas in which the same measurements are displayed (see the numerals "123400" drawn in solid line and "123400" drawn in chain line in FIG. 13) and the three areas may be located on the front, upper and back sides of the body 3 when the organic electroluminescent display sheet 55 is fixed on the back side of the body 3. With such an arrangement, the measurements can be read from all of the front, upper and back sides of the body 3.

Further, a vernier caliper with the above arrangement (i.e. the flexible organic electroluminescent display sheet 55 housed in a body in a manner capable of being drawn out of the body) can be used as a vernier caliper for a left-handed operator. Usually, when a vernier caliper is operated while being held by a right hand, the front side of the vernier caliper faces the operator. However, when the vernier caliper is operated while being held by a left hand, the back side of the vernier caliper faces the operator. At this time, since the measurements can be also read from the back side of the body, the vernier caliper can be used also for a left-handed operator. Thus, no independent vernier caliper for a left-handed operator is not necessary to be produced, so that the economic efficiency can be enhanced.

The organic electroluminescent panel 51 mentioned in the above exemplary embodiments may not be the dot-matrix panel in the exemplary embodiments but may be other type of panel. Further, the organic electroluminescent panel 51 may not only display black-and-white images but also color images.

Though the organic electroluminescent device 50A is used for the display 50, a sufficiently visible and portable display medium of which display contents can be electrically rewritten, such as an electronic paper, specifically an electrophoretic display panel may alternatively be used.

Figure 15:
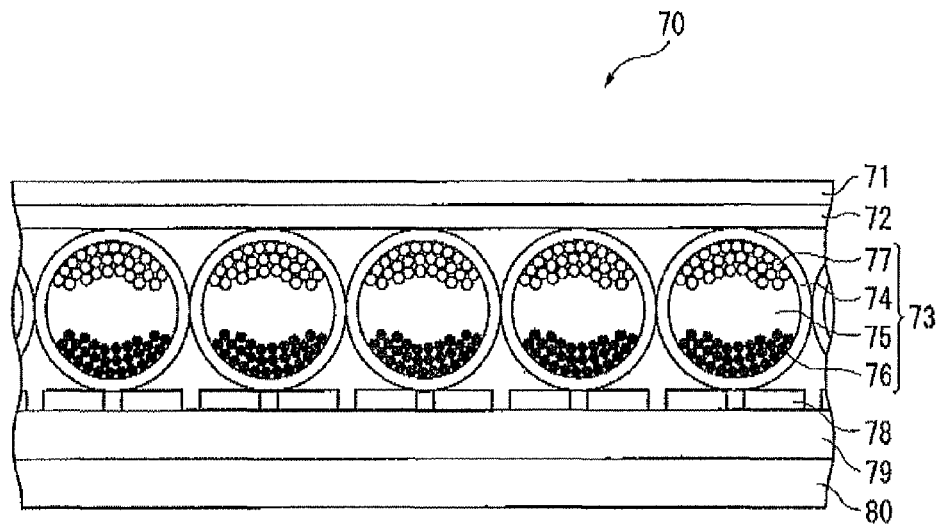
FIG. 15 illustrates an example of the display of the measuring instrument of the invention that is provided by an electronic paper.

For instance, as shown in FIG. 15, an electrophoretic display panel 70 includes a sequentially layered arrangement of a front base material 71, a common electrode 72, an electrophoretic layer 73, pixel electrodes 78, a TFT circuit layer 79 and a back base material 80. The front base material 71 and the back base material 80 are provided by a transparent resin sheet. The TFT circuit layer 79 is provided thereon with TFT circuits driven by scan-line driver circuits, specifically switching transistors. Each of the transistors is connected to the pixel electrodes 78 provided for each of the pixels. The common electrode 72 is provided by a transparent electrode material such as ITO (Indium In Oxide) and is provided substantially on the entire area of the electrophoretic display panel 70. The pixel electrodes 78 are provided for each of the pixels of the display panel 70.

The electrophoretic layer 73 includes a plurality of microcapsules 74 bonded to the common electrode. Electrophoretic-particles-dispersion liquid 75 in which a number of electrical-charged particles are dispersed is sealed in the microcapsules 74. Black electrophoretic particles (referred to as "black particles" hereinafter) 76 and white electrophoretic particles (referred to as "white particles" hereinafter) 77 are dispersed in the electrophoretic-particles-dispersion liquid 75 to form an electrophoretic layer of two-color-particles fluid. The black particles 76 and white particles 77 are charged with different polarities. Herein, the black particles 76 are negatively charged while the white particles 77 are positively charged.

The black particles 76 and the white particles 77 in the microcapsules 74 are subjected to electrophoresis by a potential difference generated between the common electrode 72 and the pixel electrodes 78.

Supposing that the pixel electrodes 78 is at a low level and the common electrode 72 is at a high level, an electric field going from the common electrode 72 to the pixel electrodes 78 is generated by the potential difference between the common electrode 72 and the pixel electrodes 78. Then, the positively charged white particles 77 move toward the pixel electrodes 78 and the negatively charged black particles 76 are moved toward the common electrode 72. Thus, the area where the potential of the pixel electrodes 78 is low as compared with the potential of the common electrode 72 is displayed in black when seen from the side of the front base material 71.

In contrast, when the pixel electrodes 78 are switched to a high level and the common electrode 72 is switched to a low level, since the direction of the electric field is reversed, the pixel is displayed in white.

When the electric field is ceased being applied while the pixel is displayed in black or white, the movement of the black particles 76 and the white particles 77 are stopped to keep the displayed colors at that time.

The invention can be applied not only to a vernier caliper, micrometer and indicator described in the exemplary embodiments but also to various measuring instruments such as a caliper gauge, coordinates measuring machine and surface texture measuring machine.

What is claimed is:

1. A measuring instrument, comprising:
    a body;
    a movable member provided to the body in a manner capable of a displacement;
    a dot-matrix type display on which measurements are displayed, comprising:
        an organic electroluminescent display device comprising an assembly of organic electroluminescence devices or an electronic paper;
        display elements arranged in a matrix; and
        a flexible display sheet having a curvable display surface, the flexible display sheet being housed in the body in a windable manner and capable of being drawn out of a front side of the body and being fixed on a back side of the body, with identical measurements displayed on the display sheet on the front side of the body and the display sheet on the back side of the body; and
    a display controller for displaying the displacement of the movable member on the display.

2. The measuring instrument according to claim 1, wherein the display is provided with a numerical image display area that displays the measurements in a numerical image, a bar-segment image display area that displays the measurements in a plurality of bar segment images and a pointer image display area that displays the measurements in a scale image and a pointer image, the numerical image display area, the bar-segment image display area and the pointer image display area being displayed in a selectable manner.

3. The measuring instrument according to claim 1, wherein the display is provided with a scale-segment image display area that displays a plurality of scale-segment images arranged in a circle and a reversed image display area that reversely displays the scale segment image corresponding to an angular area in accordance with the measurements, and the measuring instrument is provided with a scale-interval switch that switches an interval between the scale segment images in accordance with a display resolution.

4. The measuring instrument according to claim 1, wherein the display is provided with a graph image display area that displays the measurements in a graph image.

5. The measuring instrument according to claim 1, wherein the display surface has an outer profile shaped in a rectangle and is cylindrically dented along a horizontal or vertical axis of the rectangle.

6. The measuring instrument according to claim 1, wherein the display surface has an outer profile shaped in a rectangle and is cylindrically projected along a horizontal or vertical axis of the rectangle.

7. The measuring instrument according to claim 1, wherein the measuring instrument comprises a cylindrical body, a spindle provided in a manner capable of a displacement in an axial direction of the body and a display controller for displaying the displacement of the spindle on the display, and the display is provided on a circumference of the body along the axial direction.

* * * * *